US009125136B2

(12) United States Patent  (10) Patent No.: US 9,125,136 B2
Bombacino et al.  (45) Date of Patent: Sep. 1, 2015

(54) LOCATION OF UNPROTECTED ACCESS POINTS THROUGH PROTECTED ACCESS POINTS

(71) Applicant: International Business Machines Corporation, Armonk, NY (US)

(72) Inventors: Vinicio Bombacino, Rome (IT); Maximiliano Cammisa, Rome (IT); Leonardo Lanni, Rome (IT); Riccardo Pizzutilo, Rome (IT); Andrea Tortosa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 13/889,771

(22) Filed: May 8, 2013

(65) Prior Publication Data

US 2013/0315098 A1  Nov. 28, 2013

(30) Foreign Application Priority Data

May 22, 2012  (GB) .................................. 1208960.3

(51) Int. Cl.
*H04L 12/751* (2013.01)
*H04W 48/08* (2009.01)
(Continued)

(52) U.S. Cl.
CPC .............. *H04W 48/08* (2013.01); *H04L 41/12* (2013.01); *H04L 45/02* (2013.01); *H04W 48/04* (2013.01); *H04W 48/14* (2013.01); *H04W 48/16* (2013.01)

(58) Field of Classification Search
CPC ....... H04L 41/12; H04L 45/02; H04W 48/04; H04W 48/14; H04W 48/16
See application file for complete search history.

(56) References Cited

U.S. PATENT DOCUMENTS 7,532,898 B2  5/2009  Halcrow et al.
7,929,964 B2  4/2011  Arumi et al.
(Continued)

FOREIGN PATENT DOCUMENTS

GB       2475165 B      7/2012
WO   WO 2006/020103 A2  2/2006
(Continued)

OTHER PUBLICATIONS

Search Report under Section 17(5), Application No. GB1208960.3 dated Sep. 21, 2012, 3 pages.
(Continued)

*Primary Examiner* — Andrew Chriss
*Assistant Examiner* — Salvador E Rivas
(74) *Attorney, Agent, or Firm* — Francis Lammes; Stephen J. Walder, Jr.; Jeffrey S. LaBaw

(57) ABSTRACT

A solution for locating unprotected access points is provided. Particularly, a wireless network access point providing an access to a network over a wireless connection maintains a location structure comprising an indication of a geographical position of each one of a set of unprotected access points in proximity of the access point, each unprotected access point providing the access to the network at least partially unconditionally. A mobile station submits a request to access the network to the access point when the mobile station is within a transmission range thereof, receives the indication of the geographical position of at least part of the unprotected access points in response to a denial of the access from the access point, and outputs directions towards one of the unprotected access points according to the corresponding geographical position.

12 Claims, 12 Drawing Sheets

(51) Int. Cl.
  *H04L 12/24*  (2006.01)
  *H04W 48/04*  (2009.01)
  *H04W 48/16*  (2009.01)
  *H04W 48/14*  (2009.01)

(56) References Cited

U.S. PATENT DOCUMENTS

| | | | |
|---|---|---|---|
| 2005/0143094 | A1 | 6/2005 | Reed et al. |
| 2007/0167174 | A1 | 7/2007 | Halcrow et al. |
| 2007/0297355 | A1 | 12/2007 | Jendbro et al. |
| 2008/0146232 | A1 | 6/2008 | Knisely |
| 2008/0176583 | A1 | 7/2008 | Brachet et al. |
| 2009/0129291 | A1* | 5/2009 | Gupta et al. ............ 370/254 |
| 2010/0020776 | A1* | 1/2010 | Youssef et al. .......... 370/338 |
| 2010/0246486 | A1 | 9/2010 | Lin et al. |
| 2011/0159818 | A1 | 6/2011 | Scherzer et al. |
| 2011/0201311 | A1 | 8/2011 | Lee et al. |
| 2011/0238286 | A1* | 9/2011 | Roesser ................... 701/200 |
| 2011/0286437 | A1* | 11/2011 | Austin et al. ............ 370/338 |
| 2012/0155343 | A1* | 6/2012 | Wentink ................... 370/310 |
| 2012/0230305 | A1* | 9/2012 | Barbu et al. ............. 370/338 |

FOREIGN PATENT DOCUMENTS

| | | |
|---|---|---|
| WO | WO2009/029157 A1 | 3/2009 |
| WO | WO 2010/100325 A1 | 9/2010 |
| WO | WO 2011/146831 A1 | 11/2011 |

OTHER PUBLICATIONS

"WiFi finder", http://v4.jiwire.com/search-hotspot-locations.htm, retrieved Apr. 22, 2013, 4 pages.

Hortelano, Jorge et al., "A Wireless Mesh Network-based System for Hotspots Deployment and Management", Third International Conference on Networking and Services (NICS), Jun. 19-25, 2007, 6 pages.

Nakai, Y. et al., "Wi-Fi access point discovery system for mobile users", 2011 Eighth International Joint Conference on Computer Science and Software Engineering (JCSSE), Nakhon Pathom, May 11-13, 2011, Abstract only, 1 page.

International Application No. PCT/EP2013/060079, PCT Notification of Transmittal of the International Search Report and The Written Opinion of the International Searching Authority, or the Declaration (PCT/ISA/220), the PCT International Search Report (PCT/ISA/210), and the PCT Written Opinion of the International Searching Authority (PCT/ISA/237) dated Sep. 4, 2013, 12 pages.

\* cited by examiner

LOCATION OF UNPROTECTED ACCESS POINTS THROUGH PROTECTED ACCESS POINTS

BACKGROUND

The solution according to one or more embodiments of the present invention relates to the network field. More specifically, this solution relates to wireless network access.

Networks are commonly used to interconnect remote data-processing systems, in order to share resources and information; a typical example is the Internet, which is formed by billions of data-processing systems being connected one to another through a global communication network.

The access to the networks is more and more often implemented with wireless techniques (i.e., without any physical connection). This is manly due to the widespread diffusion of mobile stations (MB), such as smart-phones and net-books, which are commonly used to access the networks, and especially the Internet, while around; particularly, the increasing need of relying on remote services leveraging the Internet may require the capability of connecting to the Internet almost from everywhere.

The most common solution for accessing the Internet with a mobile station is of using a mobile telephone infrastructure; indeed, the mobile telephone infrastructure, especially if based on the $3^{rd}$ generation (3G) technology, provides a bandwidth comparable with the one commonly provided by wired connections. However, the access to the Internet with the mobile telephone infrastructure is still quite expensive; this is particularly true abroad when it is necessary to exploit a local mobile telephone operator applying very high rates. Moreover, the mobile telephone infrastructure may be not always available with the bandwidth required to provide an acceptable level of performance.

Alternatively, it is possible to connect to a wireless network Access Point (AP)—typically based on the Wireless Fidelity (Wi-Fi) technology; the access point relays information between each mobile station connected thereto and the Internet (which the access point is connected to in a wired way). The access point may be either unprotected or protected. An unprotected access point allows accessing the Internet to whatever mobile station within the unprotected access point's transmission range (for example, in public locations); conversely, a protected access point requires some sort of authentication/registration before granting the access to the Internet (for example, to restrict the protected access point's access or to collect a payment).

However, the unprotected access points are not available everywhere; therefore, it may happen that a user needing to access the Internet is not within the transmission range of any unprotected access point. In this condition, locating any unprotected access point nearby the user may be very difficult, if not impossible (especially when the user is in an unknown location, for example, abroad).

Some techniques have been proposed in the art in an attempt to alleviate this problem.

For example, U.S.-A-2005/0143094 (the entire disclosure of which is herein incorporated by reference) discloses an access point locator service that may be offered by a mobile telephone operator; in this case, the mobile telephone operator determines the access point being closest to each mobile station (according to the mobile station's current position) and notifies the closest access point to the mobile station (either in a push mode or in a pull mode). However, this requires a connection with the mobile telephone operator (with the same drawbacks pointed out above).

U.S.-A-20105159818 (the entire disclosure of which is herein incorporated by reference) discloses a method wherein the mobile stations continually collect information about the unprotected access points (comprising their position as determined via a GPS system) into a shared database, which is then used to select a specific unprotected access point that is nearby each mobile station. However, this involves high energy consumption by the mobile stations (since either their Wi-Fi or GPS functions have to be on), which strongly limits a lifetime of their batteries. Moreover, this requires a large memory space in the mobile stations to store this database and a corresponding logic to query the database; moreover, the database may be not up-to-date (with the databases' update that requires an access to the Internet that may be not available when an unprotected access point is found not to work any longer).

Likewise, in U.S.-A-2007/0167174 (the entire disclosure of which is herein incorporated by reference) the mobile stations collect information about the unprotected access points into a shared database; in this case, each mobile station sends a request for nearby unprotected access points to a provider, which selects the nearby unprotected access points from the database and returns corresponding information to the mobile station. However, as above this involves high energy consumption by the mobile stations, which strongly limits a lifetime of their batteries; moreover, this requires an access to the Internet to contact the provider, so that is does not work when this is not possible or desirable in other ways as pointed out above, or when the information about the unprotected access points cannot be downloaded in advance.

In U.S.-A-2007/0297355 as well (the entire disclosure of which is herein incorporated by reference), the mobile stations collect information about the unprotected access points; in this case, each mobile station retrieves information about nearby unprotected access points directly from other mobile stations via a local connection. A similar technique is also disclosed in "WI-FI ACCESS POINT DISCOVERY SYSTEM FOR MOBILE USERS, Nakai, Y.; Ohshima, K.; Tajima, K.; Terada, M., Computer Science and Software Engineering (JCSSE), 2011 Eighth International Joint Conference on 11-13 May 2011, ISBN: 978-1-4577-0686-8" (the entire disclosure of which is herein incorporated by reference). However, as above this involves high energy consumption by the mobile stations, which strongly limits a lifetime of their batteries. Moreover, this technique may not work when no other mobile stations are available nearby; in any case, the information provided by the other mobile stations may be of little use when the information was collected in an area that is not of interest.

SUMMARY

In general terms, the solution according to one or more embodiments of the present invention is based on the idea of exploiting the protected access points to locate the unprotected access points.

Particularly, one or more aspects of the solution according to specific embodiments of the invention are set out in the independent claims and advantageous features of the same solution are set out in the dependent claims, with the wording of all the claims that is herein incorporated verbatim by reference (with any advantageous feature provided with reference to a specific aspect of the solution according to an embodiment of the invention that applies mutatis mutandis to every other aspect thereof).

More specifically, an aspect of the solution according to an embodiment of the invention provides a method for operating a wireless network access point (providing an access to a network); when a request to access the network by a mobile station has been denied, the access point returns an indication of a geographical position of one or more of a set of unprotected access points to the mobile station.

Another aspect of the solution according to an embodiment of the invention provides a method for operating a mobile station; when a request to access a network has been denied by a wireless network access point, the mobile station receives an indication of a geographical position of one or more of a set of unprotected access points from the access point, and then the mobiles station outputs directions towards one of the set of unprotected access points.

Other aspects of the solution according to an embodiment of the invention provide a computer program product for performing these methods.

Other aspects of the solution according to an embodiment of the invention provide corresponding systems.

BRIEF DESCRIPTION OF THE SEVERAL VIEWS OF THE DRAWINGS

The solution according to one or more embodiments of the invention, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both the entity's type and the entity's attributes—such as value, content and representation). Particularly.

DETAILED DESCRIPTION

Figure 1:
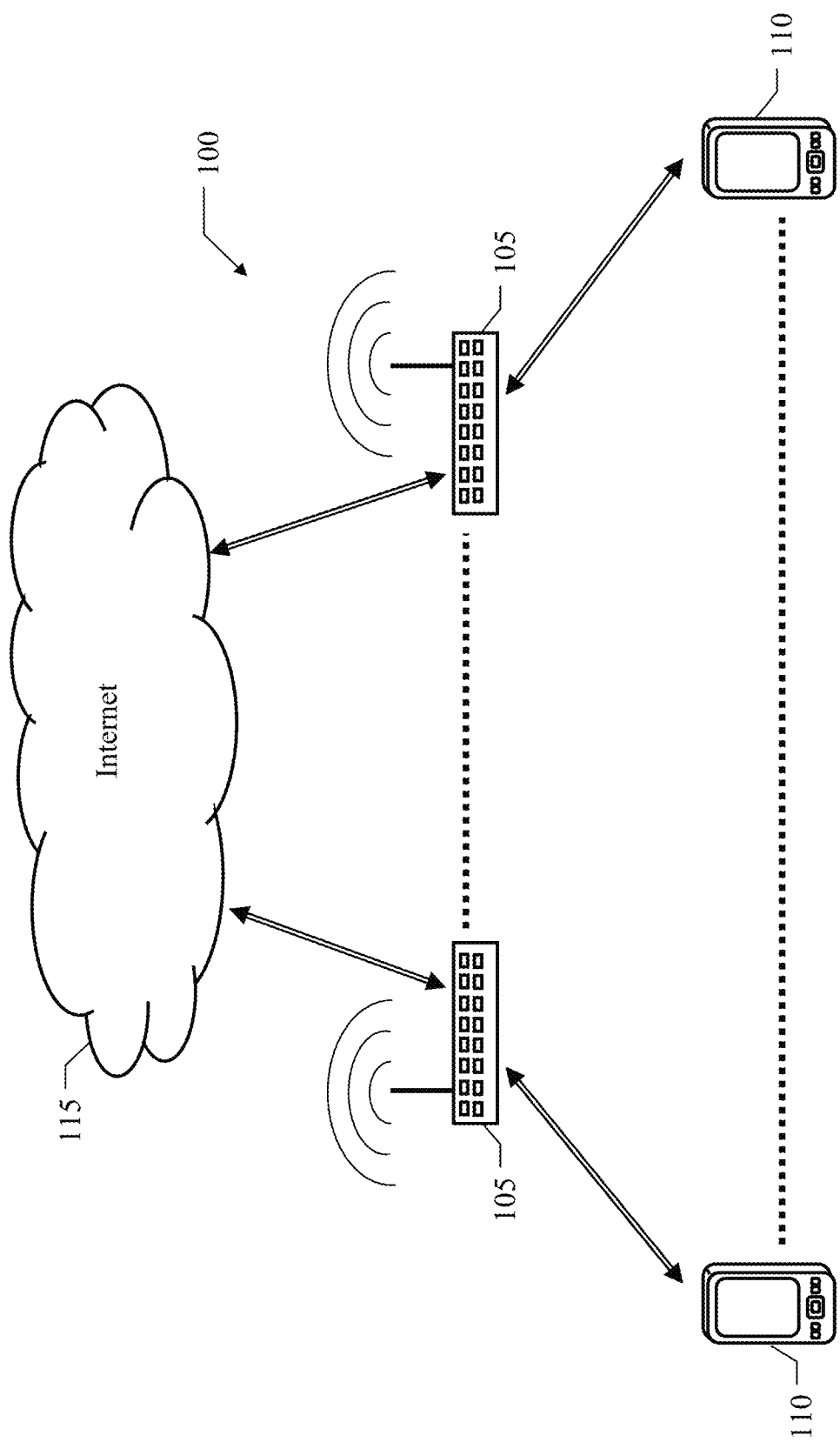
FIG. 1 shows a pictorial representation of a system wherein the solution according to an embodiment of the invention may be applied.

With reference in particular to FIG. 1, a pictorial representation is shown of a system 100 wherein the solution according to an embodiment of the invention may be applied.

The system 100 comprises a number of (wireless network) access points 105—for example, of the Wi-Fi type. Each access point 105 is used to connect different client stations within the access point's transmission range into a Wireless Local Area Network (WLAN) based on the IEEE 802.11 specification; particularly, the client stations may comprise mobile stations 110 (for example, smart-phones or net-books) that enter the access point's transmission range. Typically, the access point 105 also allows the mobile stations 110 connected thereto to access a (wired) network—for example, the Internet 115.

Some of the access points 105 are private (for example, in a company WLAN or a home WLAN); each private access point 105 is designed to allow the connection thereto (and then the access to the Internet 115 through private access point 105) only to the mobile stations 110 of designed users. For this purpose, the private access point 105 is protected so as to limit the connection only to registered mobile stations 110 defined by their unique identifiers (or MAC addresses) and/or to condition private access point 105 to the entering of a secret password.

Some other of the access points 105 (also known as hotspots) are instead public; each public access point 105 allows the connection thereto for accessing the Internet 115 to any mobile stations 110.

The public access point 105 may provide the access to the Internet 115 for free; this typically happens for public access points 105 (also referred to as free or open access points 105) offered by local authorities as a public service (for example, in train stations and airports, or even outdoor in crowded areas) or by private establishments as a complementary service to their clients (for example, in hotels, coffee shops, restaurants, shopping malls, and the like). In this case, the free access points 105 are unprotected so as to allow the connection unconditionally.

On the other hand, the public access point 105 may condition the access to the Internet 115 to some sort of payment; this typically happens for public access points 105 (also referred to as commercial access points 105) offered by commercial vendors. In this case, the commercial access points 105 are protected so as to condition the access to the Internet 115 to the required payment. For this purpose, in general any mobile station 110 is allowed to connect to the commercial access point 105, but mobile station 110 is then redirected to a captive portal that shows a login page requiring an authentication of the mobile station's user that has previously being registered for the payment (for example, by entering a pair ID/password) or a registration thereof with the selection of a payment option (for example, by entering a credit card number).

Some public access points 110 may also be hydride. In this case, the public access points 110 may provide the access for free to a set of specific web sites of the Internet 115 (referred to as walled garden feature); however, the unconditioned access to the Internet 115 is again subject to payment.

Figure 2:
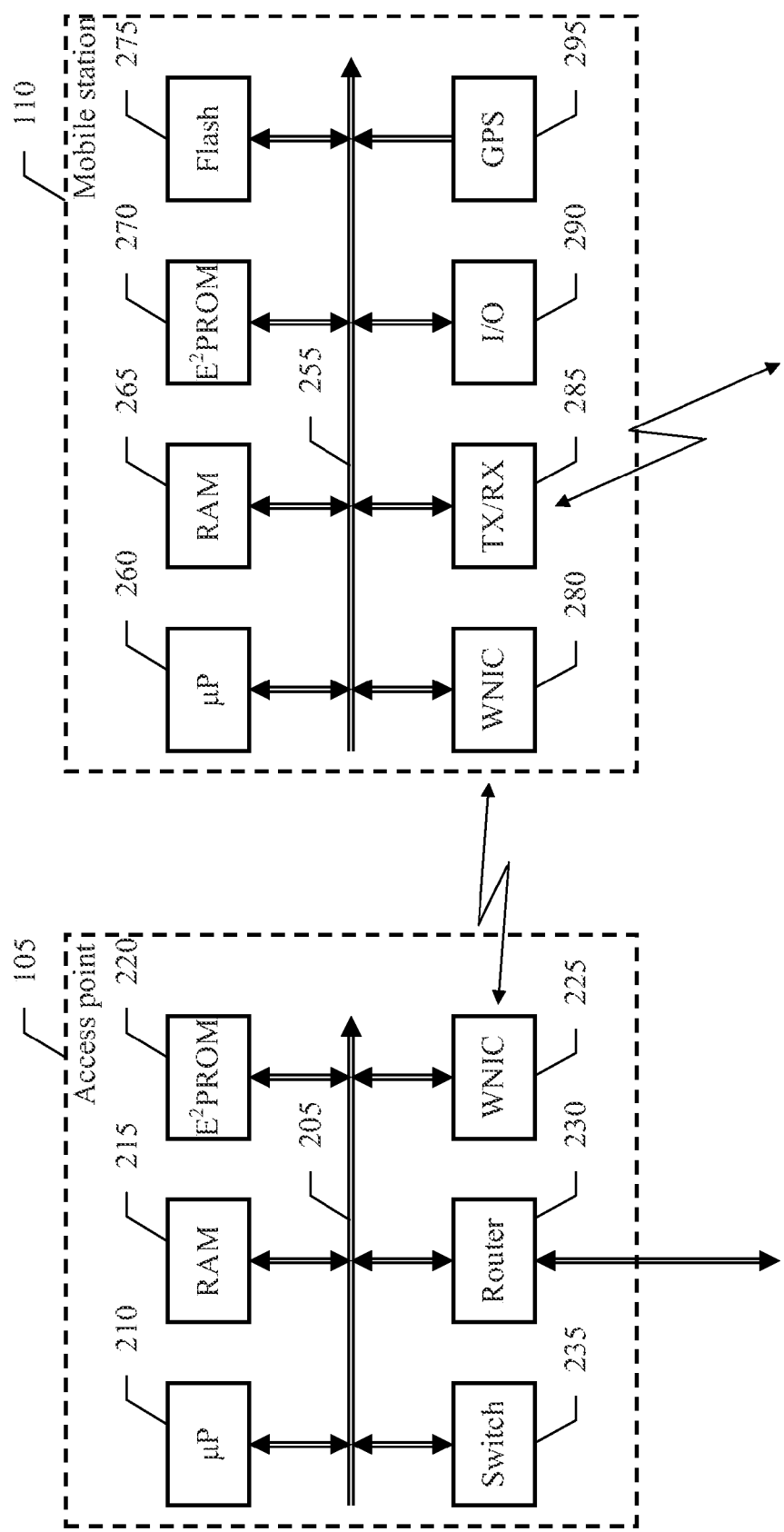
FIG. 2 shows a schematic block diagram of an access point and a mobile station that may be used to implement the solution according to an embodiment of the invention.

A schematic block diagram of an access point 105 and a mobile station 110 that may be used to implement the solution according to an embodiment of the invention is shown in the FIG. 2.

The access point 105 comprises several units that interface through a bus architecture 205. In detail, a microprocessor (μP) 210 controls operation of the access point 105; a RAM 215 is used as a working memory by the microprocessor 210, and an E²PROM 220 stores a firmware defining operation of the access point 105. A Wireless Network Interface Card (WNIC) 225 of the Wi-Fi type is used to communicate with any client stations (comprising the mobile station 110) within the mobile station's transmission range. A router 230 connects the access point 105 to an access provider (not shown in the figure) for accessing the Internet—for example, via a telephone wire; the router 230 relays information among the access provider (and then the Internet) and any client stations connected to the access point 105. The access point 105 may also comprise a switch 235, which is used to exchange information among the client stations connected to the access point 105 (in a corresponding WLAN).

The mobile station 110 as well comprises several units that interface through a bus architecture 255. In detail, a microprocessor (μP) 260 controls operation of the mobile station 110; a RAM 265 is used as a working memory by the microprocessor 260, and an E²PROM 270 stores a firmware defining operation of the mobile station 110. A flash memory card 275 (for example, of the micro SD type) provides a mass memory for storing programs and data. A WNIC 280 of the Wi-Fi type is used to communicate with any access points (comprising the access point 105) when the mobile station 110 is within their transmission ranges. Considering in particular a smart-phone, the smart-phone further comprises a mobile telephone transceiver (TX/RX) 285 for communicating with a mobile telephone infrastructure (not shown in the figure), input/output (I/O) units 290 (for example, a touchscreen, command buttons, a loudspeaker and a microphone), and a GPS receiver 295 for tracking the smart phone's position.

An exemplary scenario of application of the solution according to an embodiment of the invention is shown in the FIG. 3A-FIG. 3E.

Figure 3A:
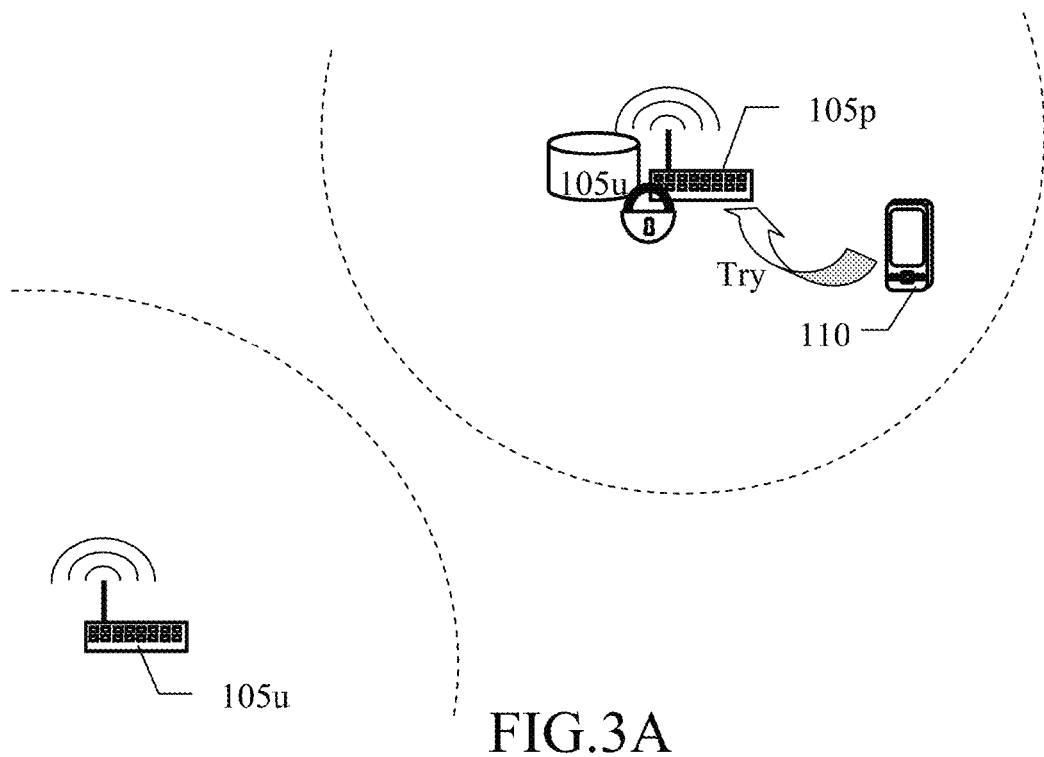
FIG. 3A-FIG. 3D show an exemplary scenario of application of the solution according to an embodiment of the invention.

Starting from the FIG. 3A, a user with his/her mobile station 110 is around (for example, abroad in an unknown city) when s/he needs to access the Internet; however, the user does not want or cannot use the mobile telephone infrastructure for this purpose (for example, because of the mobile telephone infrastructure's high cost or because the mobile telephone infrastructure is not available with the bandwidth required to provide an acceptable level of performance). One or more access points that are protected (i.e., the access points are private or commercial) are available; these private access points (only one shown in the figure) are differentiated with the reference 105p and the private access points are denoted in the figure by means of a lock. One or more other access points 105 that are unprotected (i.e., the unprotected access points are free, at least in part) are also available; these unprotected access points (only one shown in the figure) are differentiated with the reference 105u. The mobile station 110 is within the transmission range of the protected access point 105p, but the mobile station is outside the transmission range of the unprotected access point 105u.

The user cannot or does not want to use the protected access point 105p—for example, because the user is not authorized to do so (e.g., the mobile station 110 is not registered with the protected access point 105p, the user does not known the password of the protected access point 105p or s/he cannot authenticate with the protected access point 105p) or because the user does not want to pay for the protected access point's use; at the same time, the user is not aware of the availability of the unprotected access point 105u (for example, because the unprotected access point 105u is not visible directly).

Nevertheless, the user of the mobile station 110 may try to connect to the protected access point 105p. As usual, the protected access point 105p denies the connection thereto (for example, because the mobile station 110 is not recognized as registered, the user does not provide the protected access point's correct password, the user cannot authenticate or the user does not enable any payment option).

In the solution according to an embodiment of the invention, as described in detail in the following, the protected access point 105p stores an indication of a geographical position (for example, GPS geographical coordinates) of one or more unprotected access points in proximity thereof (for example, within a predefined distance); in the specific case at issue, the protected access point 105p stores the geographical position of the unprotected access point 105u.

Figure 3B:
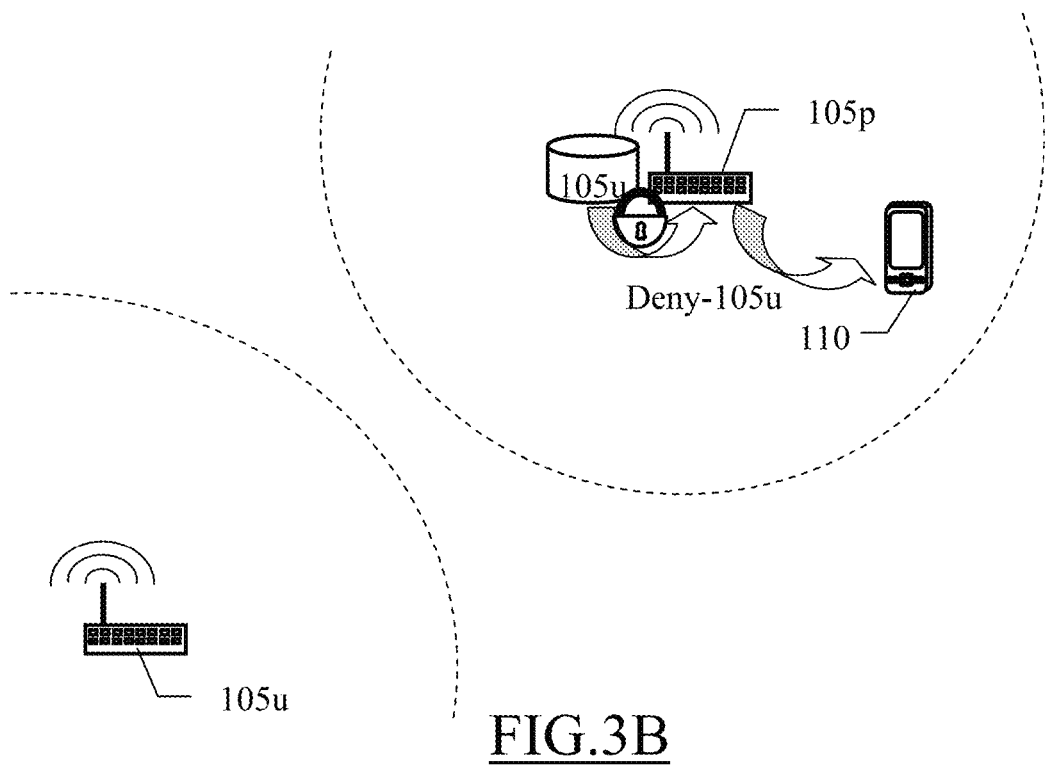

Moving to the FIG. 3B, when the protected access point 105p denies the connection, the protected access point 105p retrieves the geographical position of the unprotected access point 105u; the protected access point 105p then returns an indication of the geographical position of the unprotected access point 105u to the mobile station 110, in addition to an indication of the denial of the connection (for example, within a corresponding error message).

Figure 3C:
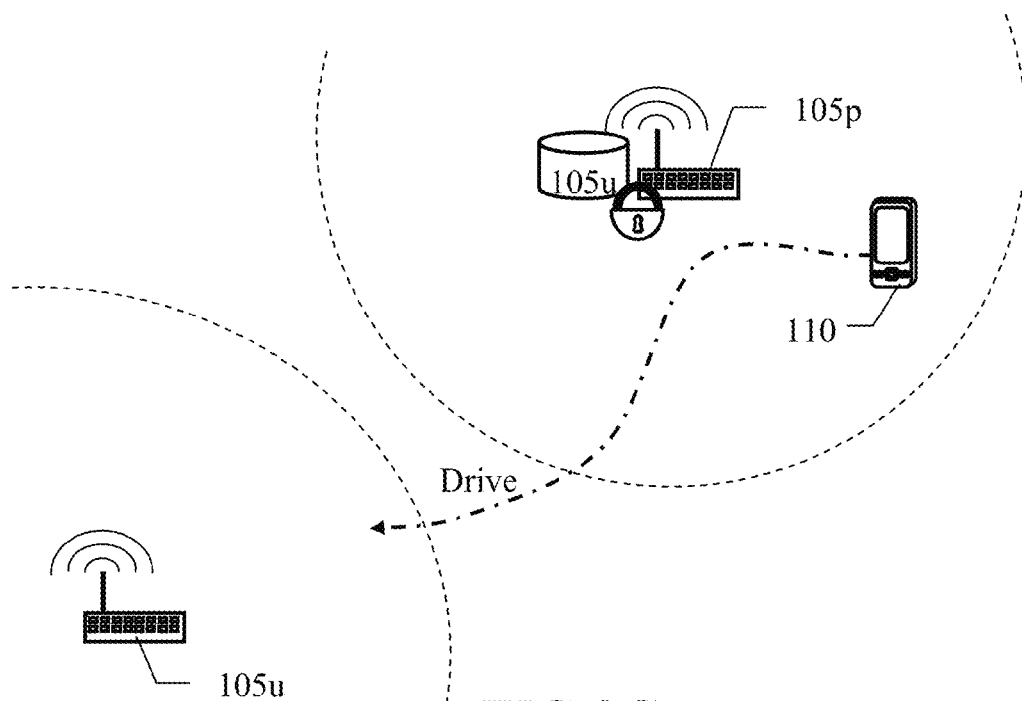

With reference now to the FIG. 3C, the mobile station 110 uses the geographical position of the unprotected access point 105u to drive the user of the mobile station 110 towards the unprotected access point 105u (for example, by means of a GPS navigator).

Figure 3D:
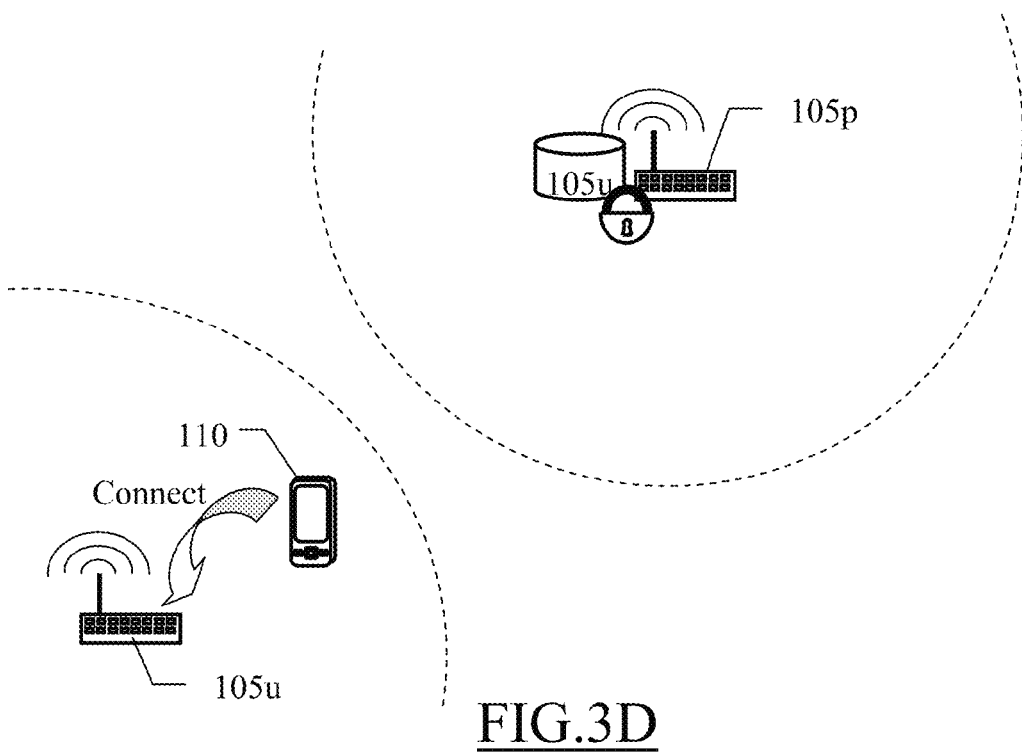

As soon as the mobile station 110 enters the transmission range of the unprotected access point 105u, as shown in the FIG. 3D, mobile station 110 may connect thereto without any problem, so as to obtain the desired access to the Internet for free.

The above-described solution allows finding the nearby unprotected access points in a very easy way.

This result is achieved without requiring any access to the Internet in another way, and particularly without requiring any connection to the mobile telephone infrastructure. Therefore, it is possible to find the unprotected access points without any additional cost; this is particularly advantageous abroad (when the local mobile telephone operators may apply quite high rates).

Moreover, the described solution is very reliable. Indeed, in most practical situations a high number of protected access points is available (for example, in urban areas); therefore, it is almost always possible to try to connect to one of the protected access points in order to obtain the information required to reach the unprotected access points (and then to access the Internet for free).

With reference now to the FIG. 4A-FIG. 4D, an example of management of the solution according to an embodiment of the invention is shown; particularly, the figures are used to illustrate a technique that may be used to determine the unprotected access points nearby the protected access points.

Figure 4A:
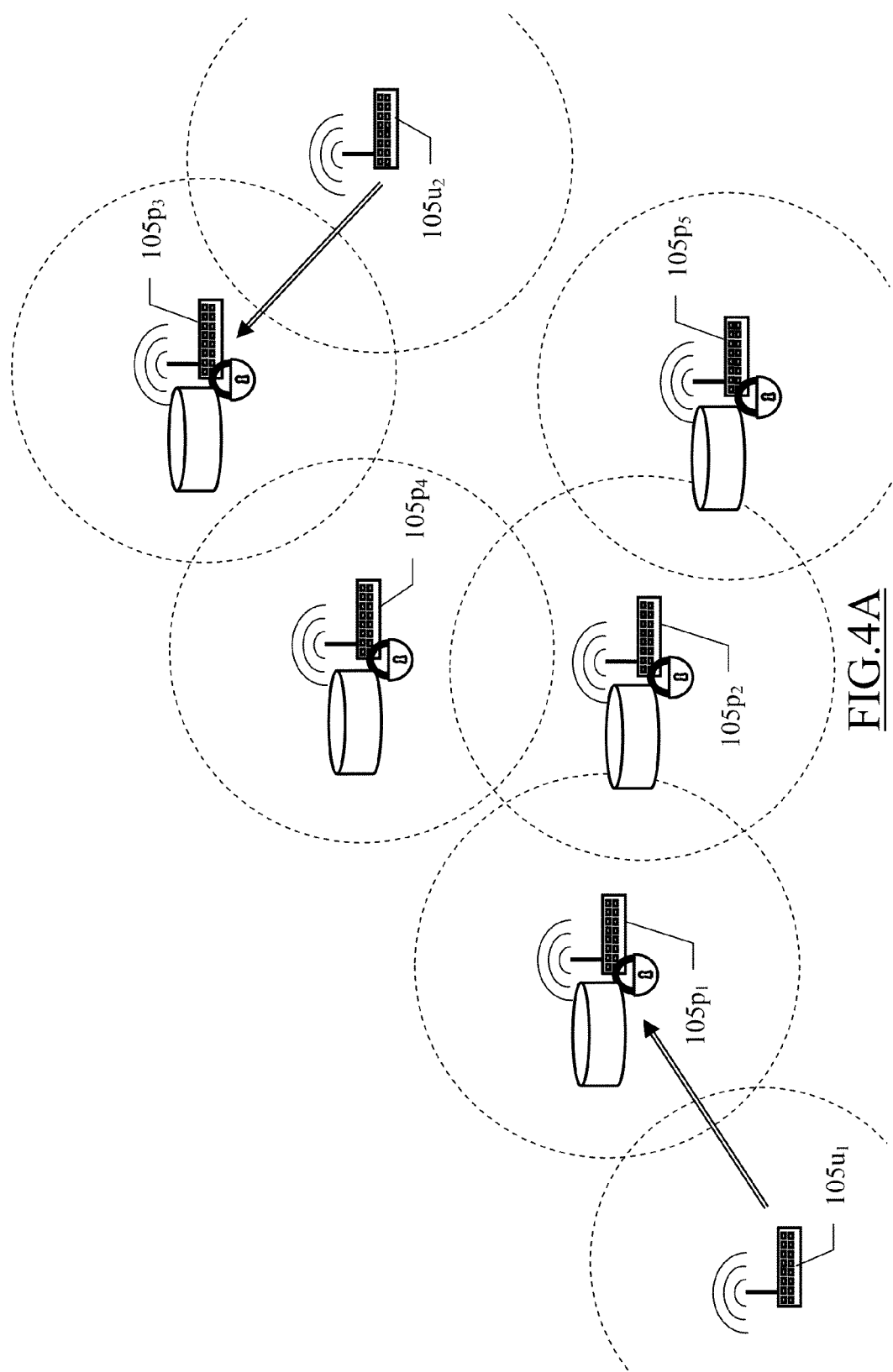
FIG. 4A-FIG. 4D show an example of management of the solution according to an embodiment of the invention.

Starting from the FIG. 4A, for this purpose the protected access points (i.e., the protected access points $105p_1$, $105p_2$, $105p_3$, $105p_4$ and $105p_5$ in the example at issue) detect the unprotected access points that are within their transmission ranges (i.e., the unprotected access points $105u_1$ and $105u_2$ in the example at issue). Therefore, in this case the protected access point $105p_1$ detects the unprotected access point $105u_1$ and the protected access point $105p_3$ detects the unprotected access point $105u_2$—whereas the protected access points $105p_2$, $105p_4$ and $105p_5$ do not detect any unprotected access point.

Figure 4B:
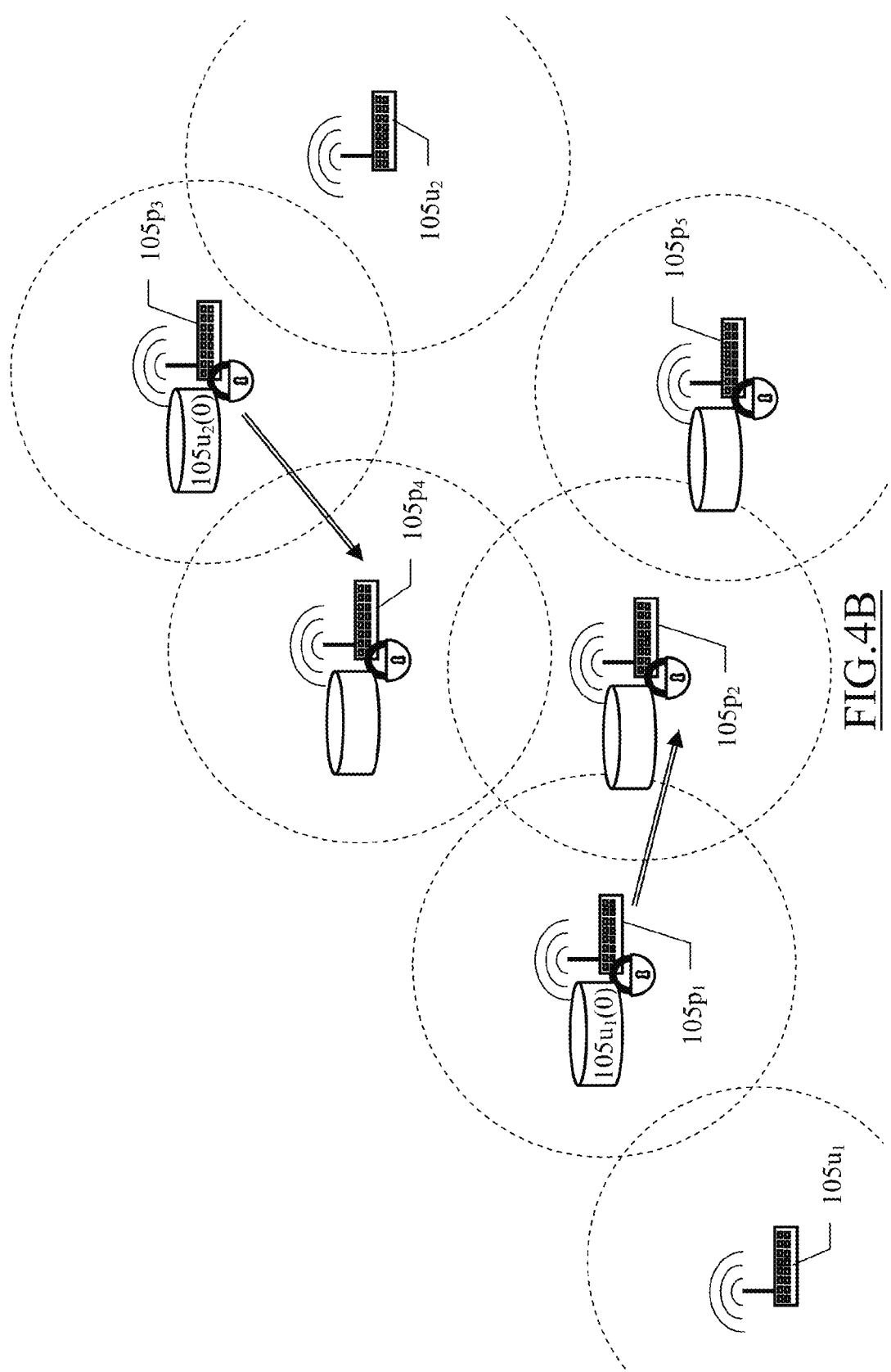

As shown in the FIG. 4B, the protected access points $105p_1$ and $105p_3$ store the geographical position of the unprotected access points $105u_1$ and $105u_2$, respectively; each unprotected access point $105u_1,105u_2$ is also associated with a hop counter being set to zero (i.e., $105u_1(0),105u_2(0)$), so as to indicate that each unprotected access point $105u_1,105u_2$ has been detected directly within the transmission range of the corresponding protected access point $105p_1,105p_3$.

Each protected access point that does not know any unprotected access point (i.e., the protected access points $105p_2$, $105p_4$ and $105p_5$ in the example at issue) requests the unprotected access points that are known to any protected access points within the protected access point's transmission range. Therefore, in this case the protected access point $105p_2$ receives the geographical position of the unprotected access point $105u_1$ from the protected access point $105p_1$, and the protected access point $105p_4$ receives the geographical position of the unprotected access point $105u_2$ from the protected access point $105p_3$ (together with their hop counters)— whereas the protected access point $105p_5$ does not receive any information (from the protected access point $105p_2$).

Figure 4C:
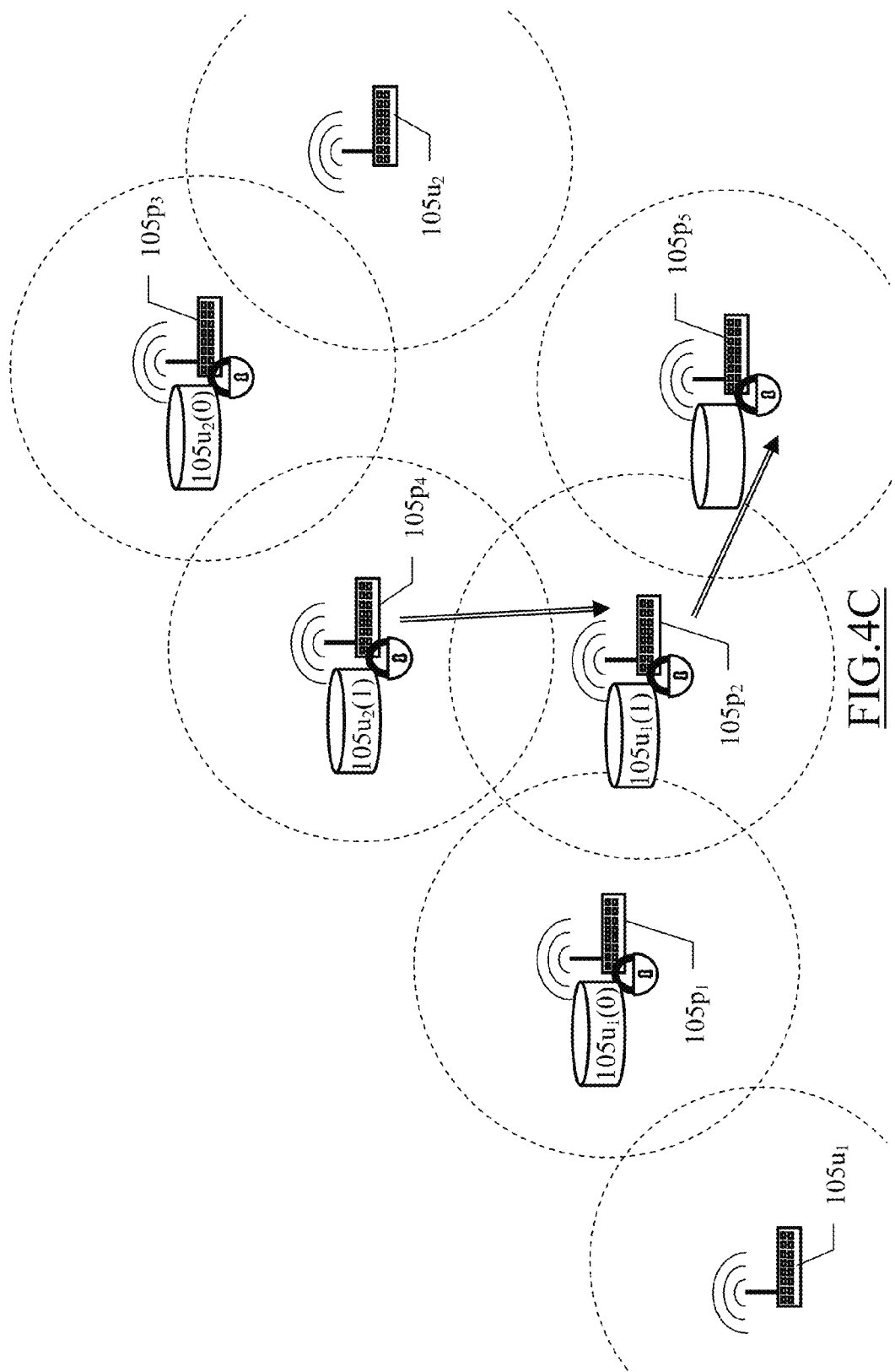

As shown in the FIG. 4C, the protected access points $105p_2$ and $105p_4$ likewise store the geographical position of the unprotected access points $105u_1$ and $105u_2$, respectively; however, the hop counter of each unprotected access point $105u_1, 105u_2$ is now incremented by one (i.e., $105u_1(1), 105u_2(1)$), so as to indicate that a further hop among the protected access points is required to reach each unprotected access point $105u_1, 105u_2$.

The same operations are reiterated continually. Therefore, at a next reiteration thereof, the protected access point $105p_2$ also receives the geographical position of the unprotected access point $105u_2$ from the protected access point $105p_4$, and the protected access point $105p_5$ receives the geographical position of the unprotected access point $105u_1$ from the protected access point $105p_2$ (together with their hop counters).

Figure 4D:
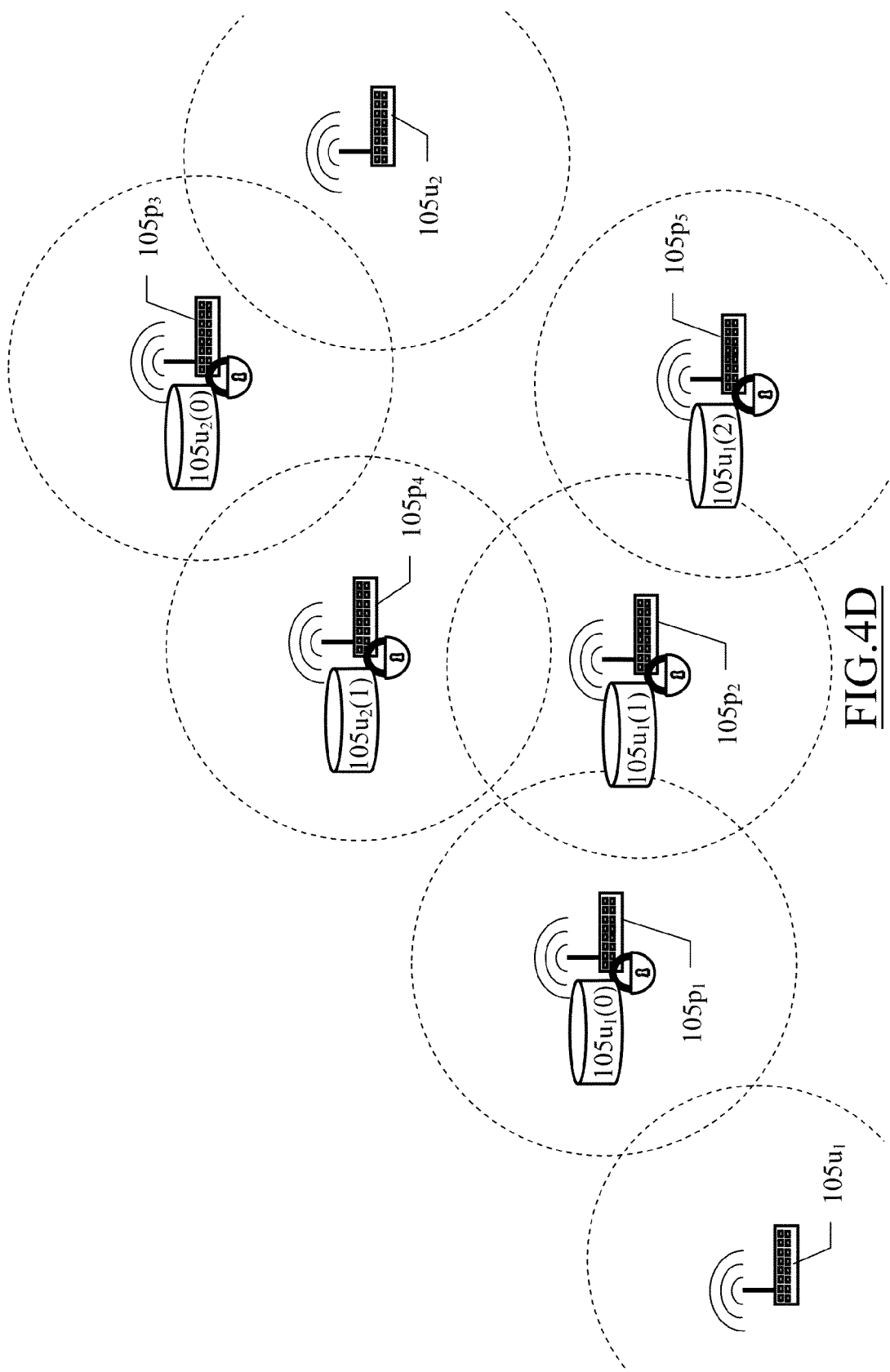

As shown in the FIG. 4D, the protected access point $105p_2$ now discards the unprotected access point $105u_2$, since the unprotected access point's $105u_2$ hop counter (i.e., 1) is higher than the hop counter of the unprotected access point $105u_1$ (i.e., 0)—meaning that the unprotected access point $105u_2$ should be far away than the unprotected access point $105u_1$ from the protected access point $105p_2$. The protected access point $105p_5$, instead, likewise stores the geographical position of the unprotected access points $105u_1$, together with the unprotected access point's $105u_1$ hop counter incremented by one (i.e., 1+1=2).

In this way, after a short transient period, every protected access point will know the unprotected access points in proximity of the protected access point. This result is achieved with a technique that exploits the protected access points themselves not only to detect the unprotected access points, but also to disseminate the corresponding information by relaying the corresponding information to the other protected access points (assuming that each protected access point may communicate with at least two other protected access points); in other words, the protected access points collaborate to propagate the information about the unprotected access points (with a technique similar to the one used in mesh networks).

The solution described above is very reliable. Indeed, the protected access points may collect the information about the unprotected access points continually, so as to update the unprotected access points almost in real-time; moreover, the information collected by each protected access point is local to the protected access point's actual position, which is fixed.

In any case, the propagation of the information about the unprotected access points is independent of the mobile stations; this avoids any waste of energy by the mobile stations, so as not to adversely affect the lifetime of their batteries.

Figure 5:
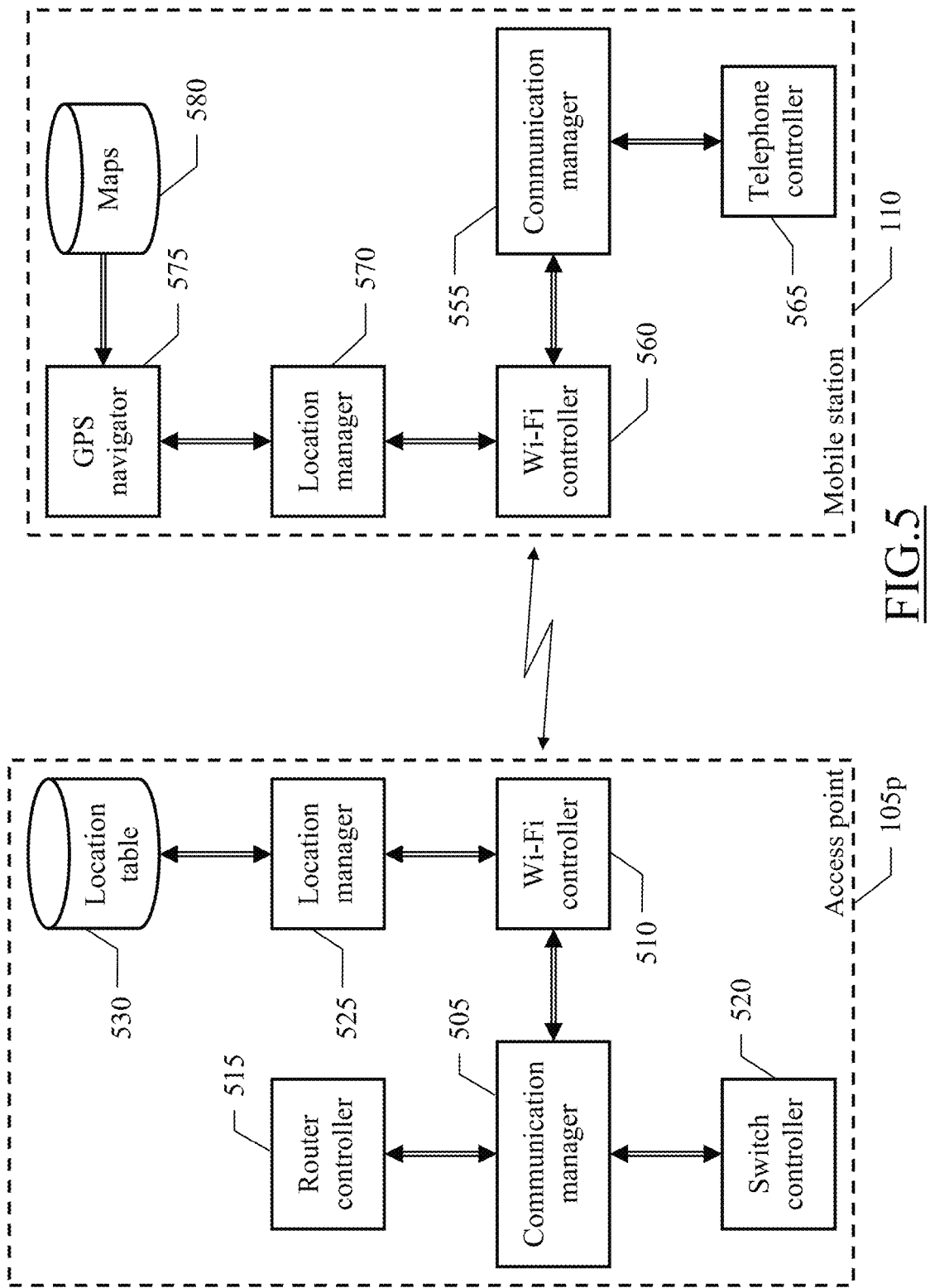
FIG. 5 shows the main software components that mat be used to implement the solution according to an embodiment of the invention.

The main software components that mat be used to implement the solution according to an embodiment of the invention are shown in the FIG. 5.

The information (programs and data) is typically stored on the E²PROM and loaded (at least partially) into the working memory of each protected access point/mobile station when the programs are running (together with possible other programs, not shown in the figure); the programs are pre-installed onto the E²PROM before the shipping of the protected access point/mobile station.

With reference in particular to a generic protected access point $105p$, a communication manager 505 manages operation of the protected access point $105p$. For this purpose, the communication manager 505 interfaces with a Wi-Fi controller 510, which implements the communications with the other (protected and unprotected) access points and the mobile stations within the protected access point's transmission range; the communication manager 505 also interfaces with a router controller 515 (which implements the communications among the mobile stations connected to the protected access point $105p$ and the Internet) and a switch controller 520 (which implements the communications among the mobile stations connected to the protected access point $105p$).

In the solution according to an embodiment of the invention, the protected access point $105p$ further comprises a (server) location manger 525. The location manager 525 interfaces with the Wi-Fi controller 510 for implementing the above-described location service of the unprotected access points. For this purpose, the location manager 525 maintains a location table 530. The location table 530 comprises one or more entries (for example, 1-5) for the unprotected access points in proximity of the protected access point $105p$. Each entry of the location table 530 stores an identifier of the corresponding unprotected access point (for example, the unprotected access point's unique Service Set Identifier, or SSID, of the IEEE 802.11 specification), the unprotected access point's geographical position (for example, the geographical coordinates defined by a signed latitude N/S and a signed longitude W/E) and the unprotected access point's hop counter ($>=0$). The entry may also store a quality index of the unprotected access point (for example, defined according to the unprotected access point's transmission round trip time, signal power, bandwidth, and the like); in this case, when the location table 530 has more than one entry, the unprotected access points are preferably arranged in decreasing order of the hop counters and quality indexes of their unprotected access points.

Moving now to a generic mobile station 110, a communication manager 555 manages operation of the mobile station 110. For this purpose, the communication manager 555 interfaces with a Wi-Fi controller 560, which implements the communications with any available (protected and unprotected) access points when the mobile station 110 is within their transmission ranges; the communication manager 555 also interfaces with a mobile telephone controller 565 (which implements the communications among the mobile station 110 and the mobile telephone infrastructure).

In the solution according to an embodiment of the invention, the mobile station 110 further comprises a (client) location manger 570. The location manager 570 interfaces with the Wi-Fi controller 560 for implementing the same location service of the unprotected access points. For this purpose, the location manager 570 exploits a GPS navigator 575, which accesses geographical maps 580.

Figure 6A:
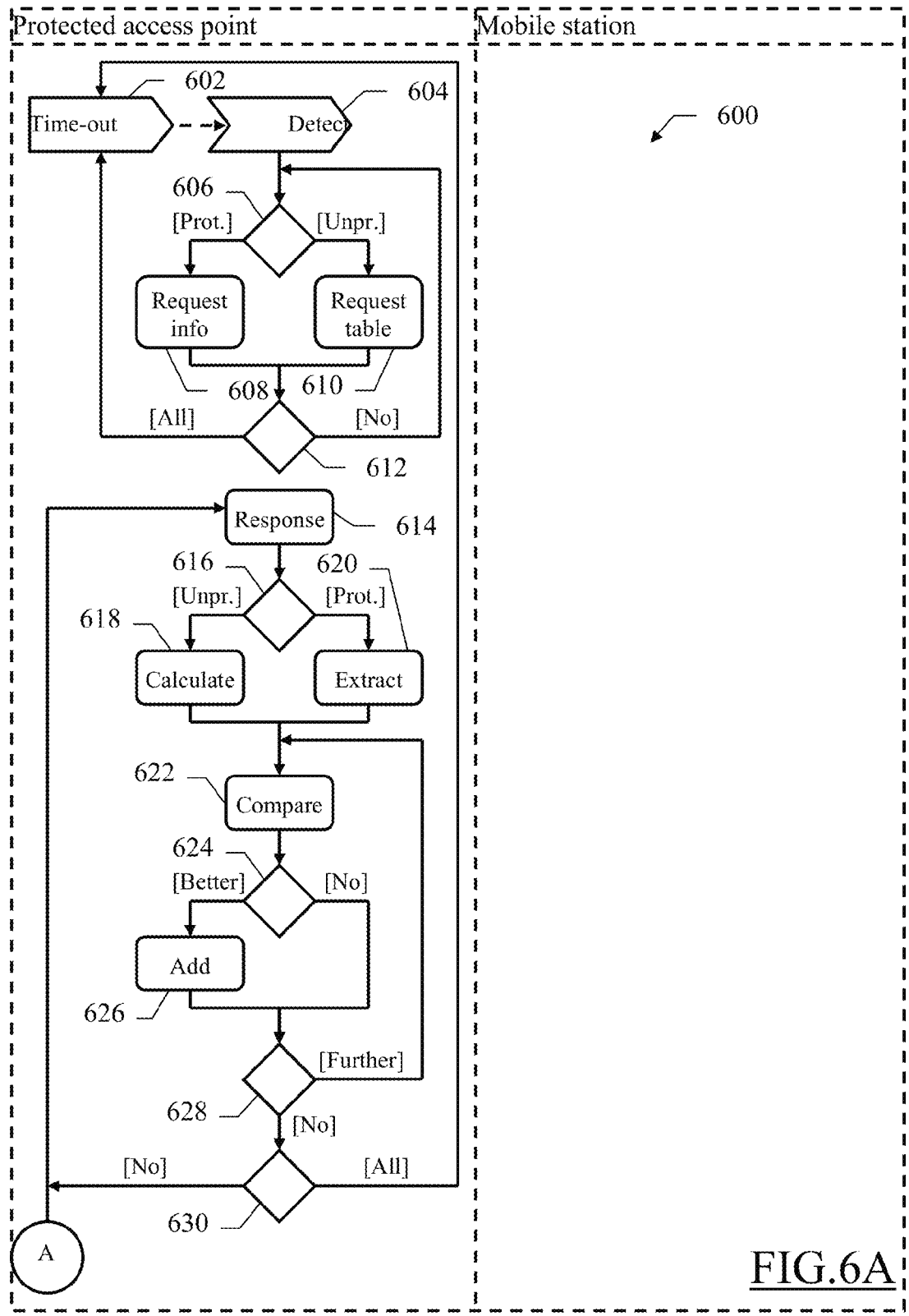
FIG. 6A-FIG. 6C show an activity diagram describing the flow of activities relating to an implementation of the solution according to an embodiment of the invention.
Figure 6B:
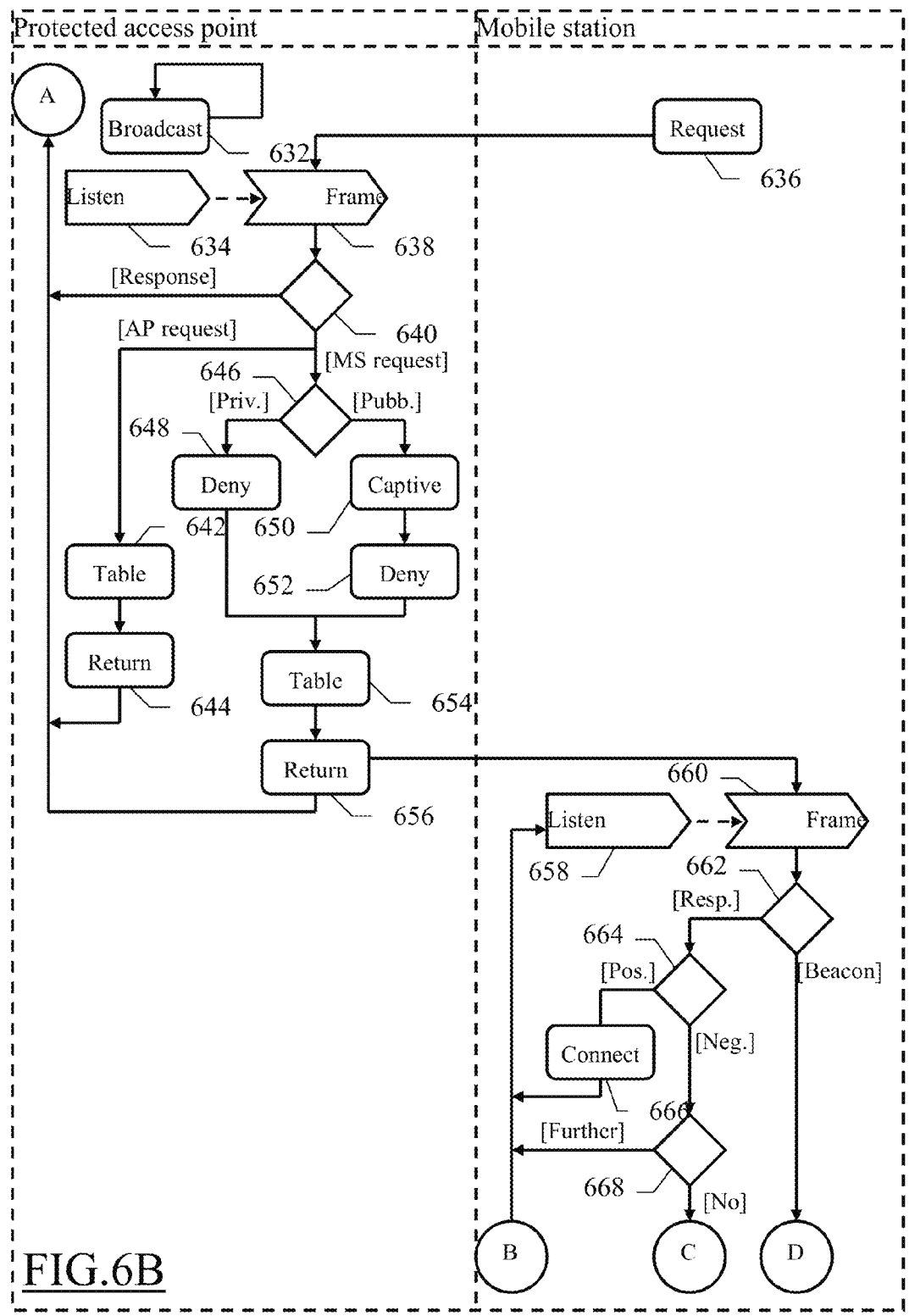
Figure 6C:
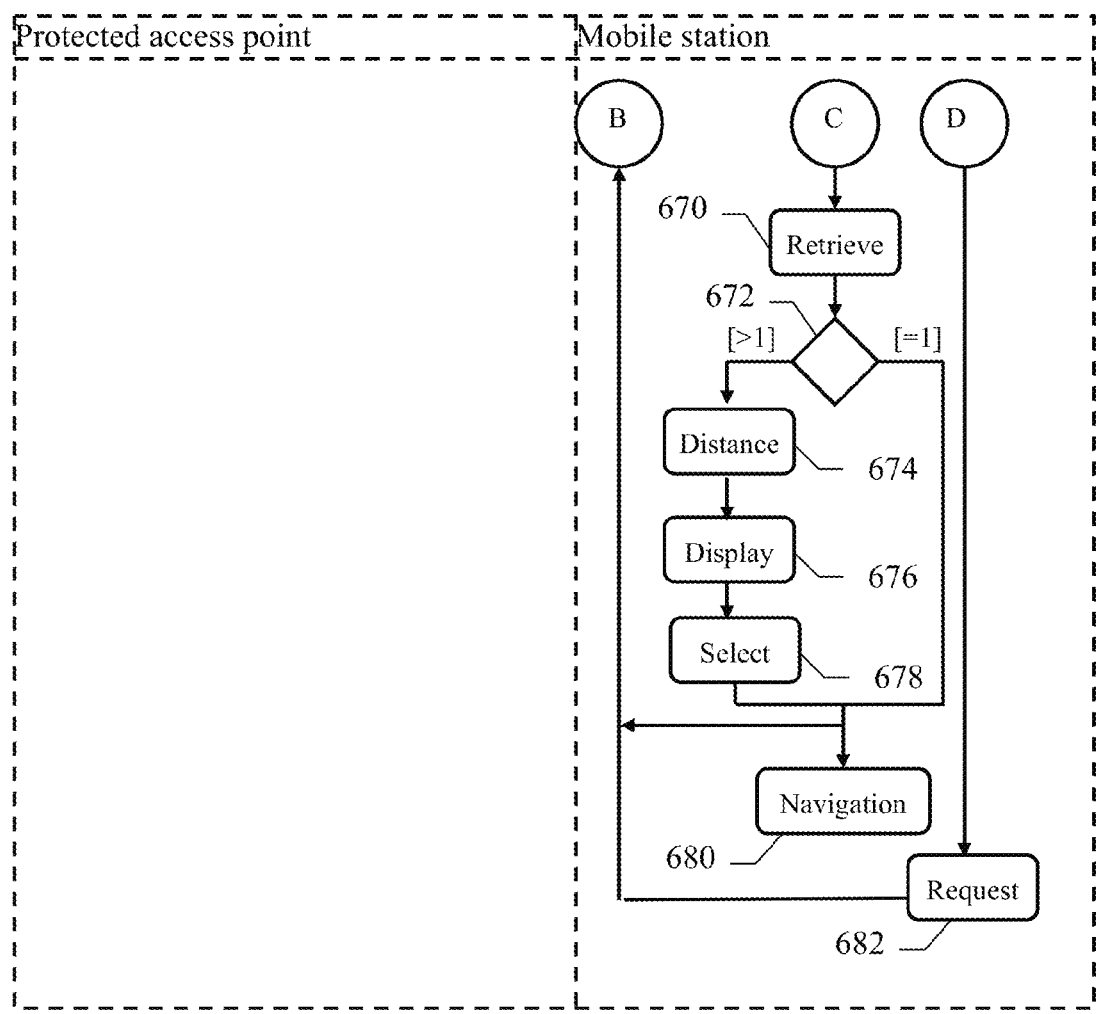

With reference now to the FIG. 6A-FIG. 6C, an activity diagram is shown describing the flow of activities relating to an implementation of the solution according to an embodiment of the invention. In this respect, each block in the diagram may represent a module, segment, or portion of code, which comprises one or more executable instructions for implementing the specified logical function(s).

Particularly, the diagram represents an exemplary implementation of the location service of the unprotected access points with a method 600. For this purpose, reference is made in the following to the 802.11 specification. In this case, information is exchanged by means of frames. Each frame comprises a header, a payload and a frame check sequence (FCS). In turn, the payload comprises four address fields, each one for storing a MAC address of 48 bits; the first address field is used to identify a receiver of the frame, the second address field is used to identify a transmitter of the frame, the third address field is used for filtering purposes by the receiver, and the fourth address field is left empty for future use.

Starting from block 602 in the swim-lane of a generic protected access point, the method passes to block 604 as soon as predefined time-out expires (for example, every 10-120 sec.). At this point, the protected access point detects any access points that are available within the protected access point's transmission range; for this purpose, the protected access point listens for any beacon frame, which is broadcast periodically by any access point to announce the access point's presence (comprising the SSID of the access point and information about the access point's possible protection).

For each detected access point (starting from the first one), the flow of activity then branches at block 606 according to the access point's type (i.e., unprotected or protected) as indicated in the corresponding beacon frame. Particularly, if the detected access point is unprotected, the protected access point at block 608 sends a probe request frame to this unprotected access point (as identified by the unprotected access point's SSID) requesting the geographical coordinates thereof (generally known to any access point) and possible performance information (for example, the unprotected access point's available bandwidth). Conversely, if the detected access point is protected, the protected access point at block 610 sends a probe request frame to this protected access point (as identified by the protected access point's SSID) requesting the protected access point's location table. In both cases, the flow of activity merges again at block 612 wherein a test is made to determine whether all the detected access points have been processed. If not, the method returns to the block 606 to repeat the same operations for a next detected access point. On the contrary, the method returns to the block 602 waiting for a next expiry of the above-mentioned time-out.

The flow of activity then passes to block 614 as soon as a corresponding probe response frame is received from each detected access point (as described in the following). The flow of activity again branches at block 616 according to the type (i.e., unprotected or protected) of the detected access point that sent the probe response frame (as indicated by the detected access point's SSID comprised therein). Particularly, if the detected access point is unprotected, the protected access point at block 618 calculates the unprotected access point's quality index and sets the unprotected access point's hop counter to zero; for example, the quality index may be defined by a weighted sum of several metrics of the unprotected access point, such as the transmission round trip time (measured between the transmission of the corresponding probe request frame and the receipt of this probe response frame), the signal power (detected by the protected access point) and the bandwidth (extracted from the probe response frame). Conversely, if the detected access point is protected, the protected access point at block 620 extracts the protected access point's location table from the probe response frame; for each unprotected access point listed in the received location table (starting from the first one), the protected access point reads the protected access point's quality index and hop counter, and then increments the read hop counter by one.

In both cases, the flow of activity merges again at block 622 wherein the protected access point compares the (new) unprotected access point (either detected directly or reported from another protected access point) with the ones listed in the protected access point's location table (starting from the last one). For example, the comparison may be based only on the hop counter (and on the quality index for the same hop counter) when the quality indexes of both the unprotected access points to be compared reach a predefined threshold (defining an acceptable level of performance); conversely, the comparison may be based on a weighed sum of their hop counters and quality indexes. The flow of activity then branches at block 624 according to a result of the above-mentioned comparison. Particularly, if the new unprotected access point is better than one or more of the unprotected access points listed in the location table (with this condition that is always fulfilled when the location table is not complete), the protected access point at block 626 adds the new unprotected access point to the protected access point's location table; when the location table has more than one entry, the new unprotected access point is inserted before all the unprotected access points of the location table that are worse than the new unprotected access point. As a result, a possible last (i.e., worst) unprotected access point of the location table is lost.

The method then descends into block 628; the same point is also reached from the block 624 directly when the new unprotected access point is worse than all the ones listed in the location table. At this point, a test is made to verify whether all the new unprotected access points have been processed; if not, the method returns to the block 622 to repeat the same operations for a next new unprotected access point of the received location table. Conversely, the method descends into block 630, wherein a further test is made to verify whether all the probe response frames have been received from the detected access points. If not, the method returns to the block 614 waiting for a next probe response frame. On the contrary (and in any case after a predefined time limit), the method returns to the block 602 waiting for a next expiry of the corresponding time-out.

In a completely asynchronous way, the protected access point at block 632 continually broadcasts a beacon frame to announce the protected access point's presence, which beacon frame comprises the SSID of the protected access point and information about the protected access point's protection.

Meanwhile, the protected access point is in a waiting condition at block 634, listening for any frames addressed thereto (as indicated by a SSID within the frames). These frames may be sent to the protected access point by other (unprotected or protected) access points or by any mobile station within the protected access point's transmission range; particularly, a generic mobile station may try to connect to the protected access point at block 636 in a corresponding swim-lane, by submitting an association request frame to the protected access point (comprising the MAC address of the generic mobile station's WNIC).

Returning to the swim-lane of the protected access point, the method passes from the block 634 to block 638 as soon as a frame addressed thereto is received. The flow of activity then branches at block 640 according to the type of the received frame (as indicated in the frame's header)—with the following description being limited only to the types of frame that are relevant to the solution according to an embodiment of the invention.

Particularly, if the protected access point has received a probe response frame from another (unprotected or protected) access point in response to the corresponding probe request frame sent thereto (at the blocks 608 and 610, respectively), the method returns to the block 614 described above.

If the protected access point has instead received a probe request frame from another protected access point (requesting the protected access point's location table), the method passes from the block 640 to block 642; in this phase, the protected access point retrieves the protected access point's location table. Continuing to block 644, the protected access point sends a probe response frame containing the protected access point's location table (and possible performance information) to this other protected access point (as indicated by the other protected access point's SSID contained in the probe request form).

At the end, if the protected access point has received an association request frame from a mobile station, the method passes from the block 640 to block 646. The flow of activity then branches according to the protection implemented by the protected access point. Particularly, if the protected access point is private (so that the protected access point's connection is limited to registered mobile stations defined by their MAC addresses and/or is conditioned to the entering of a password), the method passes to block 648. At this point, assuming that the mobile station is not registered with the protected access point or the mobile station's user does not known the password of the protected access point, the connection thereto is denied. Conversely, if the protected access point is commercial (so that the protected access point's connection is conditioned to a corresponding payment), the method passes to block 650. At this point, the user of the mobile station is allowed to connect to the protected access point, but the mobile station is redirected to a captive portal that shows a login screen requiring his/her authentication or the selection of a payment option. Assuming that the user of the mobile station is not registered or s/he does not select any payment option, the connection to the protected access point is again denied at block 652.

In both cases, the method merges again at block 654 (from either the block 648 or the block 652), wherein the protected access point retrieves the protected access point's location table. The protected access point at block 656 returns an association response frame to the mobile station (as identified by the MAC address of the mobile station's WNIC) indicating the denial of the connection thereto. In the solution according to an embodiment of the invention, this association response frame also comprises the geographical coordinates of each unprotected access point in the location table of the protected access point. For example, in case the location table has one entry only for a single unprotected access point, the unused 48 bits of the fourth address field may be used to insert the unprotected access point's geographical coordinates. Particularly, it is possible to represent the latitude with 1 bit for North or South, 7 bits for the degrees (from 0 to 89), 6 bits for the minutes (from 0 to 59) and 6 bits for the seconds (from 0 to 59), and to represent the longitude with 1 bit for West or East, 8 bits for the degrees (from 0 to 179), 6 bits for the minutes (from 0 to 59) and 6 bits for the seconds (from 0 to 59)—for a total of 41 bits; the remaining 48−41=7 bits may instead be used to represent additional information of the unprotected access point (for example, the unprotected access point's SSID and quality index). Likewise, in case the location table has more entries (for corresponding unprotected access points), it is possible to send more association response frames (as indicated in their headers), each one comprising the geographical coordinates (and the possible additional information) of a corresponding unprotected access point into the unprotected access point's fourth address field.

Referring again to the swim-lane of the mobile station, it is in a waiting condition at block 658, listening for any frames addressed thereto (as indicated by the MAC address of the frame's WNIC) from any access points. The method passes to block 660 as soon as a frame addressed to the mobile station is received.

The flow of activity then branches at block 662 according to the type of the received frame (as indicated in the frame's header)—with the following description being limited only to the types of frame that are relevant to the solution according to an embodiment of the invention.

Particularly, if the mobile station has received an association response frame from an access point (in response to a corresponding association request frame), the method passes from the block 662 to block 664 wherein the method branches according to the method's result. Particularly, if the result is positive the mobile station connects to the corresponding access point at block 666 as usual; the method then returns to the block 658 waiting for a next frame. Conversely, if the result is negative as in this case, the flow of activity branches at block 668 according to the number of unprotected access points returned from the protected access point. If further association response frames are still to be received for further unprotected access points (as indicated in the header of the association response frame), the method returns to the block 658 waiting for the missing ones. On the contrary (i.e., when a single association response frame is returned or when all the expected association response frames have been received), and in any case after a predefined time limit, the method descends into block 670. At this point, the mobile station retrieves the information of each unprotected access point (i.e., geographical coordinates and possibly SSID and quality index) from the corresponding association response frame. The method then branches at block 672 according to the number of unprotected access points. If more unprotected access points are available, the mobile station at block 674 calculates the mobile station's distance from each unprotected access point, according to a difference between the geographical coordinates of the mobile station's current position (as detected by the GPS receiver) and the geographical coordinates of the unprotected access point. Continuing to block 676, the mobile station displays a graphical representation of each unprotected access point on a map (according to their geographical coordinates), with an indication of the unprotected access point's distance and quality index. The user is then prompted to select one of the unprotected access points at block 678. As soon as the user has selected the desired unprotected access point, the method descends into block 680; the same point is also reached directly from the block 672 when a single unprotected access point is available. In this phase, the geographical coordinates of the (possibly selected) unprotected access point are passed to the GPS navigator of the mobile station, which calculates a route from the current position of the mobile station towards the unprotected access point (according to the mobile station's maps and possible preferences of the user), and then provides corresponding directions to the user (so as to help him/her to reach the unprotected access point). At the same time, the method returns to the block 658 waiting for a further frame.

On the other hand, if the mobile station has received a beacon frame from an access point, the method passes from the block 660 to block 682. Assuming that the beacon frame has been received from the unprotected access point at issue (as indicated by the unprotected access point's SSID), the mobile station automatically submits an association request frame to the unprotected access point, and the user is notified accordingly (with the possibility of terminating the navigation towards the unprotected access point). The method then returns to the block 658 waiting for a further frame. In this way, the mobile station tries to connect to the unprotected access point as soon as the mobile station enters the unprotected access point's transmission range (without requiring any manual operation).

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variable involved), and the term a/an should be intended as one or more items (unless expressly indicated otherwise).

For example, an embodiment of the invention provides a method for operating a wireless network access point, which provides an access to a network over a wireless connection. The method comprises the following steps. A location structure is maintained. The location structure comprises an indication of a geographical position of each one of a set of (one or more) unprotected access points in proximity of the access point; each unprotected access point provides the access to the network at least partially unconditionally. A request to access the network is received from a mobile station, which is within a transmission range of the access point. The access to the network is denied to the mobile station. The indication of the geographical position of at least part of the unprotected access points is returned to the mobile station in response to the denial of the access.

However, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part). In any case, the access point may provide the access to any network over any type of wireless connection (for example, of the WiMAX type). The access point may maintain the location structure (of any type, for example, an XML file) in any way (see below), for any unprotected access points in proximity thereof (see below); moreover, the geographical position of each unprotected access point may be defined in any way (see below). In any case, the same solution applies to any unprotected access points that provide some sort of free access to the network (for example, only for a limited period).

In an embodiment of the invention, the access point is protected for limiting the access to the network.

However, nothing prevents applying the same solution to unprotected access points as well when the unprotected access points are unable to grant the access to the network (for example, because of an overload condition).

In an embodiment of the invention, the step of maintaining a location structure comprises receiving a further location structure from a further access point within the transmission range of the access point; the further location structure comprises an indication of a geographical position of each one of a set of (one or more) further unprotected access points in proximity of the further access point. The location structure is updated according to each further unprotected access point.

However, the further location structures may be distributed in any other way (for example, with each protected access point that broadcasts the protected access point's location structure periodically); moreover, the location structure may be updated in any way (see below). In any case, the possibility of maintaining the location structure in any other way is not excluded (for example, by exploiting the mobile stations or a shared database).

In an embodiment of the invention, the step of maintaining a location structure comprises detecting each one of a set of (one or more) still further unprotected access points within the transmission range of the access point. An indication of a geographical position of each still further unprotected access point is detected. The location structure is then updated according to each still further unprotected access point.

However, the possibility of treating all the (protected and unprotected) access points in the same way is not excluded (with each unprotected access point as well that maintains a location structure, comprising itself, and distributes the location structure to the other access points).

In an embodiment of the invention, the steps of updating the location structure according to each further unprotected access point and updating the location structure according to each still further unprotected access point comprise updating the location structure according to a comparison among an indication of a distance of the further unprotected access point or still further unprotected access point from the access point and an indication of a distance of each unprotected access point from the access point.

However, the distance between each pair of access points may be used in any way to update the location structure; for example, the location structure may comprise all the unprotected access points whose distance from the access point is within a predefined value.

In an embodiment of the invention, the step of updating the location structure according to a comparison comprises updating the location structure according to a comparison among a hop counter of the further unprotected access point or still further unprotected access point and a hop counter of each unprotected access point; the hop counter of the further unprotected access point is incremented with respect to a value thereof in the further location structure, and the hop counter of the still further unprotected access point is set to a null value.

However, the distance between each pair of access points may be defined in any other way (for example, according to their geographical positions).

In an embodiment of the invention, the steps of updating the location structure according to each further unprotected access point and updating the location structure according to each still further unprotected access point comprise updating the location structure according to a comparison among a quality indicator of the further unprotected access point or still further unprotected access point and a quality indicator of each unprotected access point.

However, the quality indicator may be defined in any way and according to any additional or alternative parameters (down to a single one); moreover, this information may be used in any way to update the location structure (for example, by discarding the unprotected access points whose quality indicator does not reach a predefined threshold).

An embodiment of the invention provides a method for operating a mobile station. The method comprises the following steps. A request to access a network is submitted to a wireless network access point (which provides an access to the network over a wireless connection) when the mobile station is within a transmission range thereof. An indication of a geographical position of each one of a set of (one or more) unprotected access points in proximity of the access point is received in response to a denial of the access from the access point; each unprotected access point provides the access to the network at least partially unconditionally. Directions towards one of the unprotected access points are output according to the corresponding geographical position.

However, similar considerations as above apply to this method as well. In addition, the directions towards the unprotected access point may be provided in any way (even independently of any GPS system—for example, simply driving the user through the chain of access points used to detect the directions).

In an embodiment of the invention, the set of unprotected access points comprises a plurality of unprotected access points. The step of outputting directions comprises selecting said unprotected access point among the unprotected access points.

However, the unprotected access points may be selected in any way (even automatically); alternatively, the unprotected access point may be selected by the access point that denied the connection to the mobile station (so that the mobile station always receives the geographical position of a single unprotected access point).

In an embodiment of the invention, the step of selecting said unprotected access point comprises outputting an indication of a distance of each unprotected access point from the mobile station.

However, the distance may be represented in any way (for example, simply by the distance's value).

In an embodiment of the invention, the step of outputting an indication of a distance comprises detecting an indication of a geographical position of the mobile station; the distance of each unprotected access point is determined according to a comparison between the indication of the geographical position of the unprotected access point and the indication of the geographical position of the mobile station.

However, the distance may be determined in any way (for example, according to the geographical position of the access point that denied the access to the mobile station or even simply by the corresponding hop counter).

In an embodiment of the invention, the method further comprises the step of receiving an indication of a quality indicator of each unprotected access point in response to the denial of the access from the access point; the step of selecting said unprotected access point further comprises outputting a representation of the quality indicator of each unprotected access point.

However, the quality indicator may be of any type (see above), and the quality indicator may be indicated in any way (for example, with a graphical representation).

An embodiment of the invention provides a computer program comprising code means for causing a data-processing system (i.e., an access point or a mobile station) to perform the steps of the above-described methods (i.e., for operating the access point or the mobile station, respectively), when the computer program is executed on the data-processing system.

However, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in base-band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wire-line, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. In the specific case of the access point, the program code may execute entirely on the access point, partly on the access point as a stand-alone software package, partly on the access point and partly on a remote computer or entirely on the remote computer or server. In the latter scenario, the remote computer may be connected to the access point through any type of network, including a local area network (LAN) or a wide area network (WAN), or the connection may be made to an external computer (for example, through the Internet using an Internet Service Provider). Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks. These computer program instructions may also be stored in a computer readable medium that can direct a computer, other programmable data-processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data-processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

An embodiment of the invention provides a system (i.e., an access point or a mobile station), which comprises means for performing the steps of the same methods as above.

However, similar considerations apply if the system has a different structure or comprises equivalent components, or the system has other operative characteristics. In any case, every component thereof may be separated into more elements, or two or more components may be combined together into a single element; moreover, each component may be replicated to support the execution of the corresponding operations in parallel. It is also pointed out that (unless specified otherwise) any interaction between different components generally does not need to be continuous, and the interaction may be either direct or indirect through one or more intermediaries. Moreover, the mobile station may be replaced by any mobile code execution entity (for example, a PDA, a laptop, and the like).

The invention claimed is:

1. A method for operating a wireless network access point providing an access to a network over a wireless connection, the method comprising:
    maintaining a location structure comprising an indication of a geographical position of each one of a set of unprotected access points in proximity of the wireless network access point, each unprotected access point in the set of unprotected access points providing the access to the network at least partially unconditionally;
    receiving a request to access the network from a mobile station within a transmission range of the wireless network access point;
    denying the access to the network to the mobile station;
    returning the indication of the geographical position of one or more of the set of unprotected access points to the mobile station in response to the denial of the access to the network;
    responsive to receiving a further location structure from a further access point within the transmission range of the wireless network access point, the further location structure comprising an indication of a geographical position of each one of a set of further unprotected access points in proximity of the further access point, updating the location structure according to each further unprotected access point;
    responsive to detecting each one of a set of still further unprotected access points within the transmission range of the wireless network access point and determining an indication of a geographical position of each still further unprotected access point, updating the location structure according to each still further unprotected access point;
    updating the location structure according to a comparison among an indication of a distance of the further unprotected access point or still further unprotected access point from the wireless network access point and an indication of a distance of each unprotected access point from the wireless network access point; and
    updating the location structure according to a comparison among a hop counter of a further unprotected access point or a still further unprotected access point and a hop counter of each unprotected access point, the hop counter of the further unprotected access point being incremented with respect to a value thereof in a further location structure and the hop counter of the still further unprotected access point being set to a null value.

2. The method according to claim 1, wherein the wireless network access point is protected for limiting the access to the network.

3. The method according to claim 1, wherein the updating the location structure according to each further unprotected access point and the updating the location structure according to each still further unprotected access point comprise:
    updating the location structure according to a comparison among a quality indicator of the further unprotected access point or still further unprotected access point and a quality indicator of each unprotected access point.

4. A method for operating a mobile station, the method comprising:
    submitting a request to access a network to a wireless network access point providing an access to the network over a wireless connection when the mobile station is within a transmission range of the wireless network access point;
    receiving an indication of a geographical position of each one of a set of unprotected access points in proximity of the wireless network access point in response to a denial of the access from the wireless network access point, each unprotected access point in the set of unprotected access points providing the access to the network at least partially unconditionally, wherein the set of unprotected access points includes a set of further unprotected access points within the transmission range of the wireless network access point and a set of still further unprotected access points within the transmission range of the wireless network access point; and
    outputting directions towards a plurality of unprotected access points in the set of unprotected access points according to a corresponding geographical position, wherein outputting the directions towards the plurality of unprotected access points comprises: outputting an indication of a distance of each of the plurality unprotected access points from the mobile station and outputting a hop counter value from each of the plurality unprotected access points to the mobile station, wherein the distances and hop counts are retrieved from a location structure that identifies a comparison between the indication of the geographical position of each unprotected access point and the indication of the geographical position of the mobile station as the distance of each of the plurality unprotected access points from the mobile station and that identifies a comparison among a hop counter value of the further unprotected access point or still further unprotected access point and a hop counter value of each unprotected access point as the hop counter value as the hop counter value from each of the plurality unprotected access points to the mobile station, the hop counter value of the further unprotected access point being incremented with respect to a hop counter value thereof in the further location structure and the hop counter value of the still further unprotected access point being set to a null value.

5. The method according to claim 4, wherein the set of unprotected access points comprises a plurality of unprotected access points, and wherein the outputting of the directions comprises:
selecting the unprotected access point among the plurality of unprotected access points.

6. The method according to claim 5, further comprising:
receiving an indication of a quality indicator of each of the plurality unprotected access points in response to the denial of the access from the wireless network access point, and
wherein the selecting the unprotected access point among the plurality of unprotected access points further comprising:
outputting a representation of the quality indicator of each unprotected access point in the plurality of unprotected access points.

7. A computer program product comprising a non-transitory computer readable storage medium having a computer readable program stored therein, wherein the computer readable program, when executed on a computing device, causes the computing device to:
maintain a location structure comprising an indication of a geographical position of each one of a set of unprotected access points in proximity of a wireless network access point, each unprotected access point in the set of unprotected access points providing the access to a network at least partially unconditionally;
receive a request to access the network from a mobile station within a transmission range of the wireless network access point;
deny the access to the network to the mobile station;
return the indication of the geographical position of one or more of the set of unprotected access points to the mobile station in response to the denial of the access to the network;
responsive to receiving a further location structure from a further access point within the transmission range of the wireless network access point, the further location structure comprising an indication of a geographical position of each one of a set of further unprotected access points in proximity of the further access point, update the location structure according to each further unprotected access point;
responsive to detecting one of a set of still further unprotected access points within the transmission range of the wireless network access point and determining an indication of a geographical position of each still further unprotected access point, update the location structure according to each still further unprotected access point;
update the location structure according to a comparison among an indication of a distance of the further unprotected access point or still further unprotected access point from the wireless network access point and an indication of a distance of each unprotected access point from the wireless network access point; and
update the location structure according to a comparison among a hop counter of a further unprotected access point or a still further unprotected access point and a hop counter of each unprotected access point, the hop counter of the further unprotected access point being incremented with respect to a value thereof in a further location structure and the hop counter of the still further unprotected access point being set to a null value.

8. The computer program product according to claim 7, wherein the wireless network access point is protected for limiting the access to the network.

9. The computer program product according to claim 7, wherein the computer readable program to update the location structure according to each further unprotected access point and the instructions to update the location structure according to each still further unprotected access point further causes the computing device to:
update the location structure according to a comparison among a quality indicator of the further unprotected access point or still further unprotected access point and a quality indicator of each unprotected access point.

10. A system comprising:
a processor; and
a memory coupled to the processor, wherein the memory comprises instructions which, when executed by the processor, cause the processor to:
maintain a location structure comprising an indication of a geographical position of each one of a set of unprotected access points in proximity of a wireless network access point, each unprotected access point in the set of unprotected access points providing the access to a network at least partially unconditionally;
receive a request to access the network from a mobile station within a transmission range of the wireless network access point;
deny the access to the network to the mobile station;
return the indication of the geographical position of one or more of the set of unprotected access points to the mobile station in response to the denial of the access to the network;
responsive to receiving a further location structure from a further access point within the transmmission range of the wireless network access point, the further location structure comprising an indication of a geographical position of each one of a set of further unprotected access points in proximity of the further access point, update the location structure according to each further unprotected access point;
responsive to detecting each one of a set of still further unprotected access points within the transmission range of the wireless network access point and determining an indication of a geographical position of each still further unprotected access point, update the location structure according to each still further unprotected access point;
update the location structure according to a comparison among an indication of a distance of the further unprotected access point or still further unprotected access point from the wireless network access point and an indication of a distance of each unprotected access point from the wireless network access point; and
update the location structure according to a comparison among a hop counter of a further unprotected access point or a still further unprotected access point and a hop counter of each unprotected access point, the hop counter of the further unprotected access point being incremented with respect to a value thereof in a further location structure and the hop counter of the still further unprotected access point being set to a null value.

11. The system according to claim 10, wherein the wireless network access point is protected for limiting the access to the network.

12. The system according to claim 10, wherein the instructions to update the location structure according to each further unprotected access point and the instructions to update the location structure according to each still further unprotected access point further causes the processor to:
    update the location structure according to a comparison among a quality indicator of the further unprotected access point or still further unprotected access point and a quality indicator of each unprotected access point.

\* \* \* \* \*